United States Patent [19]

Walters et al.

[11] Patent Number: 5,462,588
[45] Date of Patent: Oct. 31, 1995

[54] FLAME RETARDED ASPHALT COMPOSITION

[75] Inventors: Robert B. Walters; Paul J. Schmidtline, both of Morrison, Colo.

[73] Assignee: Schuller International, Inc., Denver, Colo.

[21] Appl. No.: 233,153

[22] Filed: Apr. 25, 1994

[51] Int. Cl.$^6$ ............................. C08L 95/00; C09K 21/10
[52] U.S. Cl. ................... 106/18.21; 106/18.14; 106/281.1; 106/284.06; 106/284.1; 106/284.2
[58] Field of Search ................. 106/18.14, 18.21, 106/284.2, 284.06, 281.1, 284.1

[56] References Cited

U.S. PATENT DOCUMENTS

| | | | |
|---|---|---|---|
| 2,667,425 | 1/1954 | Bierly | 106/15.05 |
| 3,053,714 | 9/1962 | Edwards | 252/606 |
| 3,224,890 | 12/1965 | Skelton et al. | 106/15.05 |
| 3,342,614 | 9/1967 | Koons | 106/18.24 |
| 3,523,893 | 8/1970 | Lobos | 252/5 |
| 4,022,945 | 5/1977 | MacKenzie, Jr. et al. | 428/389 |
| 4,105,566 | 8/1978 | Miller et al. | 252/8.1 |
| 4,137,198 | 1/1979 | Sachs | 521/154 |
| 4,157,991 | 6/1979 | Pilla | 106/14.26 |
| 4,284,682 | 8/1981 | Tschirch et al. | 428/263 |
| 4,359,546 | 11/1982 | Bershas | 524/501 |
| 4,368,228 | 1/1983 | Gorgati | 428/110 |
| 4,387,175 | 6/1983 | Bohm et al. | 524/68 |
| 4,420,524 | 12/1983 | Gorgati | 428/110 |
| 4,425,399 | 1/1984 | Bershas | 428/288 |
| 4,491,617 | 1/1985 | O'Connor et al. | 428/236 |
| 4,503,176 | 3/1985 | Barlow et al. | 524/62 |
| 4,512,806 | 4/1985 | Graham | 106/18.24 |
| 4,514,326 | 4/1985 | Sallay | 252/602 |
| 4,514,327 | 4/1985 | Rock | 252/607 |
| 4,637,946 | 1/1987 | Shah et al. | 428/63 |
| 4,659,381 | 4/1987 | Walters | 106/18.16 |
| 4,707,413 | 11/1987 | Kehr et al. | 428/440 |
| 4,719,723 | 1/1988 | Van Wagoner | 52/15 |
| 4,722,953 | 2/1988 | DeRuiter et al. | 524/44 |
| 4,737,406 | 4/1988 | Bumpus | 428/288 |
| 4,741,773 | 5/1988 | Kuroda et al. | 106/2 |
| 4,771,090 | 9/1988 | Kehr et al. | 524/68 |
| 4,804,696 | 2/1989 | Jolitz et al. | 524/68 |
| 4,812,349 | 3/1989 | Meulbeck | 428/138 |
| 4,824,709 | 4/1989 | Tschirch | 428/95 |
| 4,860,509 | 8/1989 | Laaly et al. | 52/173 R |
| 4,906,726 | 3/1990 | Cummings | 528/230 |
| 5,055,135 | 10/1991 | Grube et al. | 106/281.1 |
| 5,100,715 | 3/1992 | Zimmerman et al. | 428/147 |

FOREIGN PATENT DOCUMENTS

| | | | |
|---|---|---|---|
| 1005202 | 2/1977 | Canada. | |
| 60-197761 | 10/1985 | Japan | 106/284.2 |

*Primary Examiner*—Anthony Green
*Attorney, Agent, or Firm*—Cornelius P. Quinn

[57] ABSTRACT

Described is a flame retarded asphalt composition comprising: a) a bituminous composition; b) a thermoplastic elastomer; c) an inert filler; d) a halogenated flame retardant; and e) an effective flame retardant amount of a nitrogen heterocyclic composition having at least six members and containing at least three nitrogen atoms.

6 Claims, No Drawings

FLAME RETARDED ASPHALT COMPOSITION

TECHNICAL FIELD

This invention relates to a flame retarded asphalt composition suitable for use as a roofing membrane wherein the material also contains a thermoplastic elastomer.

BACKGROUND ART

Various fabric reinforced modified bitumen or asphalt products have been used in the past as membranes on residential and commercial roofing. Typically, the modified bitumen is used with suitable polymeric and/or fiber glass reinforcing mats, felts, or scrims to produce a sheet product which is used as the roofing membrane.

U.S. Pat. No. 4,659,381 describes a flame retarded asphalt composition containing thermoplastic elastomer modified bitumen, an inert filler, a halogenated flame retardant, and an inorganic phosphorous compound.

Many other patents are concerned with flame retardant compositions. For example, U.S. Pat. Nos. 2,667,425; 3,053,714; 3,224,890; 3,342,614; 3,523,893; 4,022,945; 4,105,566; 4,137,198; 4,157,991; 4,284,682; 4,359,546; 4,368,228; 4,387,175; 4,420,524; 4,425,399; 4,491,617; 4,503,176; 4,512,806; 4,514,326; 4,514,327; 4,637,946; 4,659,381; 4,707,413; 4,719,723; 4,722,953; 4,737,406; 4,741,773; 4,771,090; 4,804,696; 4,812,349; 4,824,709; 4,860,509; 4,906,726; 5,055,135; 5,100,715; and Canadian Patent No. 1,005,202.

It is an object of the present invention to obtain an improved flame retarded modified bitumen coating asphalt compositions.

It is an object of the present invention to obtain an improved flame retarded modified bitumen coating asphalt compositions that are available at less cost to the customer.

SUMMARY OF THE INVENTION

Described is a flame retarded asphalt composition comprised of:

a. a bituminous composition;

b. a thermoplastic elastomer;

c. an inert filler;

d. a halogenated flame retardant; and e. an effective flame retardant amount of a nitrogen heterocyclic composition having at least six members and containing at least three nitrogen atoms.

BEST MODE FOR CARRYING OUT THE INVENTION

As used herein, the terms "bituminous" and "bitumen" may be replaced with the term "asphalt" which substantially means petroleum asphalt.

The term "modified bitumen" as used herein signifies a bitumen material which has incorporated in it an agent to improve the elongation, flexibility, temperature susceptibility and adhesive properties of ordinary bitumen.

Examples of modifiers are thermoplastic elastomers or thermoplastic rubbers. These agents include, but are not limited to, styrene-butadiene-styrene (SBS), styrene-isoprene-styrene (SIS), and styrene-ethylene-butylene-styrene (SEBS). These agents may simply by blended into the bitumen.

While only a very small amount of the thermoplastic elastomer or rubber modifier needs to be present in the compound bitumen in order for desirable elongation, flexibility, temperature resistance and adhesiveness properties to be achieved, preferably about 3–20 wt. % of the modifier is used based upon the weight of the compound bitumen, and most preferably about 6–15 wt. %.

Preferably, about 20–40 wt. % modified bitumen will be used in the inventive flame retarded composition based upon the total weight of the inventive composition. (As given throughout the specification, all percentages specified for materials and ingredients utilized in the inventive flame retarded composition are based upon the total weight of the composition).

The modified bitumen will preferably contain about 20–30 wt. % of one or more inert fillers. These fillers are generally finely divided solids. They are included to improve the properties of the inventive asphalt material. For example, the fillers are typically used to add weight (if desired), to act as extenders thereby increasing the volume of the composition at minimal cost, or act as reinforcing agents thereby providing increased strength. Examples of such fillers include, but are not limited to, perlite, mica powder, alumina, glass fibers, calcium carbonate (limestone), magnesium carbonate, finely divided clays, silica, and carbon black.

Whatever inert fillers are used should be finely divided such that they are easily blended with the other materials of the inventive composition and do not make it lumpy. Preferably, the average particle diameter of such an inert filler will be between about 40 and 300 microns.

It is thought that any commercially available halogenated flame retardant additive known to those skilled in the art can be utilized in the present invention. Examples of halogenated flame retarded additives include, but are not limited to the following:

multi-brominated diphenyl oxides, e.g., decabromodiphenyl oxide (DBDPO);

multi-brominated benzenes, e.g. 2,3,4,5,6-pentabromoethylbenzene;

multi-brominated bisphenol-A and esters thereof; e.g. tetrabromobisphenol-A;

multi-brominated diphenoxy compounds, e.g. 1,2-Bis 2,4,6-tribromophenoxy ethane;

multi-brominated pthalimides, e.g. ethylene-bistetrabromophthalimide;

multi-brominated phthalic anhydrides, e.g. tetrabromophthalic anhydrides;

multi-brominated phenols, e.g. 2,4,6-tribromo phenols;

multi-brominated cyclodecanes, e.g. hexabromo-cyclododecane; and chlorinated alicyclic hydrocarbons, e.g. Dechlorane Plus (trademark of Occidental Chemical).

About 1–20 wt. % and preferably about 3–10 wt. % of the halogenated flame retardant compound is utilized in the present invention.

The nitrogen heterocyclic composition is preferably present in an amount of 0.5 to 10% by weight, preferably 1 to 8% by weight, and even more preferably, 1 to 5% by weight of the composition. The preferred nitrogen heterocyclic material is melamine. Other preferred heterocyclic compositions are triazine or hydrogenated triazines such as hexahydrotriazine. The triazines may likewise be substituted with nitrogen or other derivatives such as the N-methyl or N-methylol derivatives. The ring itself may likewise be substituted with nitrogen-containing compositions such as amines and substituted lower alkyl or lower alkanol (1–6 carbon atoms) amines such as the NO,N-dimethyl or NO,N-dimethylol of the 1,3,5 nitrogen derivative of melamine.

In addition, the nitrogen heterocyclic material may likewise be a resin such as melamine formaldehyde resin. Commercially available melamine formaldehyde resins are well known to the industry and need not be repeated here.

Listed below are preferred embodiments of the present invention wherein all parts are parts by weight and all temperatures are degrees Centigrade unless otherwise indicated. Asphalt compositions were prepared as follows:

Laboratory Results
Asphalt Composition, % by weight:

| Ingredients | A | B |
| --- | --- | --- |
| PolyBase 3506 [Asphalt Flux] | 55.8 | 55.8 |
| Kraton D-1101* | 14.0 | 14.0 |
| Antioxidant | 0.2 | 0.2 |
| Limestone | 25.0 | 25.0 |
| DecaBromoBiPhenyl Oxide | 2.0 | 2.0 |
| Antimony Oxide | 1.0 | 1.0 |
| Melamine (Ground) | 2.0 | |
| Melamine (Unground) | | 2.0 |
| | 100.0 | 100.0 |

| Bunsen Burner Fire Test | | |
| --- | --- | --- |
| Crust Formation Time, minutes | 1.75 | 1.7 |
| Time at which sample will not sustain combustion when burner is removed. | 4. | 3.7 |

*Kraton is a trademark of Shell Chemical Company for SBS thermoplastic elastomer.

A typical laboratory bunsen burner flame was impinged on 0.125 inch thick molded samples of these compositions. It was observed that an insulating crust of char formed more quickly on the compositions. As the test progressed, the development of the char increased reducing the intensity of the combustion of the sample material. The bunsen burner flame was then periodically removed (momentarily) from the sample surface. It was observed that the samples containing the inventive concept ceased combustion when the burner was removed at the times indicated in the table. These observations indicated that the samples containing the inventive concept have resistance to combustion by char formation which inhibits the combustion process.

LARGE SCALE FIRE TESTS

Formulation Number B above was prepared and taken to Underwriters Laboratories Fire protection Labs in Northbrook, Illinois. UL-790 Spread of Flame tests was performed on the following roof systems and the results shown in the following table. The test performed at 1 inch slope with Sample B passed UL 790 Class A requirements by not burning more than 6 feet. This is a significant improvement since the standard formulation has never been able to pass Class A requirements at slopes greater than ½ inch. In addition to providing improved fire resistance to the modified bitumen formulation, the melamine is considerably less expensive than previously available commercial products providing for a lower cost product. See the following UL 790 Spread of Flame Tests.

UL 790 SPREAD OF FLAME TESTS

| Slope | Insulation | Adhesive | Membrane | Longitudinal Burn Length | Lateral Burn |
| --- | --- | --- | --- | --- | --- |
| 1.2" | 2¾" Fesco* | Type III** | Sample B GlasPly IV GlasBase*** | 3' 8" | None |
| ½" | 2¾" Fesco | Type III | Sample B GlasPly IV GlasBase | 4' 6" | None |
| 1" | 2¾" Fesco | Type III | Sample B GlasPly IV GlasBase | 5' 4" | None |

*Fesco is a trademark of Schuller International for roofing insulation.
**Asphalt Type III having a softening point of 185–205° F.
***GlasPly is a trademark of Schuller International for fiberglass felt; GlasBase is a trademark of Schuller International for fiberglass base sheet.

The above compositions can have inserted therein inorganic phosphorous-containing compounds such as monoammonium phosphate, diammonium phosphate, triammonium phosphate, ammonium polyphosphate, and red phosphorous. About 1–5 wt. % and preferably about 2–4 wt. % of the inorganic phosphorous-containing compound may be utilized in the present invention.

A metal oxide hydrate may also be utilized. Examples include aluminum trihydrate, calcium borate hydrates, barium borate hydrates, zinc borate hydrates, and magnesium oxide hydrates. When utilized, the metal oxide hydrate should be present in an amount of no greater than about 30 wt. %.

Also antimony containing materials may be added such as antimony oxide, and the like. About 1–5 wt. % and preferably 1–3 wt. % of the antimony oxide may be utilized.

The inventive composition can be prepared by heating the modified bitumen to about 350° F. and then dry blending the other ingredients with a spatula. Alternatively, a Ross high speed blender may be utilized.

While the forms of the invention herein disclosed constitute presently preferred embodiments, many others are possible. It is not intended herein to mention all of the possible equivalent forms or ramifications of the invention. It is understood that the terms used herein are merely descriptive rather than limiting, and that various changes may be made without departing from the spirit or scope of the invention.

What is claimed is:

1. A flame retarded asphalt composition comprising:
   a. a bituminous composition;
   b. a thermoplastic elastomer;
   c. an inert filler;
   d. from 1 to 20 wt. % of a halogenated flame retardant; and
   e. from 0.5 to 10 wt. % of a nitrogen heterocyclic composition having at least six ring members and containing at least three nitrogen atoms.

2. The composition of claim 1 wherein the inert filler is 20–30 wt. %;
   the halogenated flame retardant is 1–20 wt. %; and
   the nitrogen heterocyclic composition is present in an amount from 1 to 8 wt. %.

3. The composition of claim 2 wherein the heterocyclic composition is comprised of triazine.

4. The composition of claim 3 wherein the triazine is melamine.

5. The composition of claim 1 further comprising an inorganic phosphorous-containing compound present in an amount of 1 to 5% by weight.

6. The composition of claim 1 further comprising an inorganic antimony containing compound present in an amount of 1 to 5% by weight.

* * * * *